(12) United States Patent
Saito et al.

(10) Patent No.: US 9,350,045 B2
(45) Date of Patent: May 24, 2016

(54) NONAQUEOUS ELECTROLYTE SECONDARY BATTERY AND METHOD FOR MANUFACTURING THE SAME

(75) Inventors: Motoharu Saito, Kobe (JP);
Shinnosuke Ichikawa, Kobe (JP);
Katsunori Yanagida, Kobe (JP);
Masahisa Fujimoto, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 1013 days.

(21) Appl. No.: 13/250,295

(22) Filed: Sep. 30, 2011

(65) Prior Publication Data

US 2012/0082897 A1    Apr. 5, 2012

(30) Foreign Application Priority Data

Sep. 30, 2010   (JP) ................. 2010-222620
Jun. 29, 2011   (JP) ................. 2011-144094

(51) Int. Cl.
| | |
|---|---|
| H01M 10/0525 | (2010.01) |
| H01M 4/131 | (2010.01) |
| H01M 4/1391 | (2010.01) |
| H01M 4/505 | (2010.01) |
| H01M 4/525 | (2010.01) |
| H01M 10/058 | (2010.01) |

(52) U.S. Cl.
CPC .......... *H01M 10/0525* (2013.01); *H01M 4/131* (2013.01); *H01M 4/1391* (2013.01); *H01M 4/505* (2013.01); *H01M 4/525* (2013.01); *H01M 10/058* (2013.01); *Y02E 60/122* (2013.01); *Y02P 70/54* (2015.11)

(58) Field of Classification Search
CPC ..... H01M 4/131; H01M 4/525; H01M 4/505; H01M 4/1391; H01M 10/0525; H01M 10/058; H01M 2004/028; Y02E 60/122
USPC .................. 429/231.3, 231.1, 231.9, 231.95; 29/623.1
See application file for complete search history.

(56) References Cited

U.S. PATENT DOCUMENTS 5,478,674 A * 12/1995 Miyasaka .................. 429/231.3
2002/0098146 A1   7/2002 Takada et al.
2010/0173202 A1   7/2010 Saito et al.
2010/0239912 A1   9/2010 Saito et al.
2010/0248040 A1   9/2010 Saito et al.
2012/0135319 A1   5/2012 Saito et al.

FOREIGN PATENT DOCUMENTS

| EP | 0 630 064 A1 | 12/1994 |
| JP | 06-310143 A | 11/1994 |
| JP | 2002-220231 A | 8/2002 |
| JP | 2007-220650 A | 8/2007 |
| JP | 2009-032681 A | 2/2009 |
| JP | 2010-225348 A | 10/2010 |
| WO | 2006/071972 A2 | 7/2006 |

OTHER PUBLICATIONS

Zhang et al. "Effect of Ti doping on the Electrical Transport and Magnetic Properties of Layered Compound Na0.8CoO2", Solid State Communications (2005), 135(8), pp. 480-484.*
Shi et al. "Effects of Mn and Ti doping on superconductivity and charge ordering in NaxCoO2 system", Los Alamos National Laboratory, Preprint Archive, Condensed Matter (2005) 1-22, arXiv:cond-mat/050132, Jan. 4, 2005: LNCMFR URL: http://xxx.lanl.gov/pdf/cond-mat/050132.*
Carlier, D. et al., "On the metastable O2-type LiCoO2," Solid State Ionics, 2001, p. 263-276, vol. 144 cited in spec.
Lu, Zhonghua, et al., "T2 and O2 Li2/3[CoxNi1/3-x/2Mn2/3-x/2]O2 Electrode Materials", Journal of the Electrotechnical Society, 2002, p. A1083-A1091, vol. 149 cited in spec.
Paulsen, J.M. et al., "O2: A New Layered Cathode Material for Rechargeable Lithium Batteries", Journal of the Electrochemical Society, 2000, p. 2478-2485, vol. 147 cited in spec.
Extended European Search Report dated Nov. 7, 2012, issued in corresponding European Patent Application No. 11183255.6, (8 pages).
Office Action dated Feb. 24, 2015, issued in corresponding Japanese Application No. 2011-144094. (3 pages).
Carlier, D. et al., "Lithium Electrochemical Deintercalation from O2-LiCoO2 Structure and Physical Properties", Journal of the Electrochemical Society, 149 (1) A1310-A1320 (2002) (11 pages).

* cited by examiner

*Primary Examiner* — Laura Weiner
(74) *Attorney, Agent, or Firm* — Westerman, Hattori, Daniels & Adrian, LLP

(57) ABSTRACT

The nonaqueous electrolyte secondary battery includes: a positive electrode containing a positive-electrode active material; a negative electrode; and a nonaqueous electrolyte. The positive-electrode active material contains a lithium-containing oxide obtained by ion-exchanging part of sodium in a cobalt-containing oxide containing lithium, sodium, and titanium with lithium.

3 Claims, 6 Drawing Sheets

NONAQUEOUS ELECTROLYTE SECONDARY BATTERY AND METHOD FOR MANUFACTURING THE SAME

BACKGROUND OF THE INVENTION

1. Field of the Invention

This invention relates to nonaqueous electrolyte secondary batteries and methods for manufacturing the same.

2. Description of Related Arts

Nonaqueous electrolyte secondary batteries are presently widely used as secondary batteries having high energy density.

Exemplary positive electrode materials conventionally used in nonaqueous electrolyte secondary batteries are lithium-transition metal composite oxides, such as $LiCoO_2$. Exemplary negative electrode materials used are carbon materials capable of storing and releasing lithium. Exemplary nonaqueous electrolytic solutions used are organic solvents, such as ethylene carbonate or diethyl carbonate, in which a lithium salt, such as $LiBF_4$ or $LiPF_6$, is dissolved as an electrolyte salt.

In recent years, mobile devices using nonaqueous electrolyte secondary batteries have increased power consumption such as because of their increasing range of functions. Therefore, there is strong demand for nonaqueous electrolyte secondary batteries having even higher energy density.

In order to realize a nonaqueous electrolyte secondary battery having a higher energy density, its positive-electrode active material must be increased in capacity. For this purpose, various high-capacity positive-electrode active materials and methods for manufacturing them have been proposed, for example, in JP-A-2009-32681, J. Electrochem. Soc, 149 (8) (2002)A1083, J. Electrochem. Soc, 147(7) (2000)2478, and Solid State Ionics 144 (2001)263.

The crystal structure of a lithium-containing layered compound $LiCoO_2$ presently widely used as a positive-electrode active material is an O3 structure belonging to space group R-3m. In relation to this lithium-containing layered compound $LiCoO_2$, if lithium in the crystal structure is extracted about 60% by application of a potential of 4.5 V (vs. $Li/Li^+$) or more, the crystal structure tends to break down to make the reversibility of the electrode reaction poor. Therefore, with the use of a lithium-containing layered compound belonging to space group R-3m, such as $LiCoO_2$, the maximum possible discharge capacity density is about 160 mAh/g.

In order to further increase the discharge capacity density, the positive-electrode active material must be able to hold a stable structure even when a larger amount of lithium is extracted. One proposed method for manufacturing a lithium-containing layered compound having the above structure is to manufacture a lithium-containing layered compound by ion-exchanging a sodium-containing layered compound.

Specifically, for example, JP-A-2009-32681 describes a process for producing a lithium-containing oxide containing a minute amount of sodium by ion-exchanging part of sodium in a sodium-containing oxide with lithium. In addition, JP-A-2009-32681 also describes, as a lithium-containing oxide produced by the above process, a lithium-containing oxide belonging to space group $P6_3mc$ and/or Cmca and represented by the composition formula $Li_ANa_BMn_xCo_yO_{2\pm\alpha}$ (where $0.5 \leq A \leq 1.2$, $0 < B \leq 0.01$, $0.40 \leq x \leq 0.55$, $0.40 \leq y \leq 0.55$, $0.80 \leq x+y \leq 1.10$, and $0 \leq \alpha \leq 0.3$).

This lithium-containing oxide described in JPA-2009-32681 is less likely to cause the crystal structure to break down even if a large amount of lithium is extracted from it by charging to a high potential. This literature states that, therefore, a high charge/discharge capacity density can be obtained by using the above lithium-containing oxide as a positive-electrode active material.

SUMMARY OF THE INVENTION

However, if the lithium-containing oxide described in JP-A2009-32681 is used as a positive-electrode active material, this poses a problem of difficulty in satisfactorily increasing the capacity retention of a resultant nonaqueous electrolyte secondary battery.

The present invention has been made in view of the foregoing points; an object thereof is to provide a nonaqueous electrolyte secondary battery having a high capacity retention.

A first nonaqueous electrolyte secondary battery according to the present invention includes: a positive electrode containing a positive-electrode active material; a negative electrode; and a nonaqueous electrolyte. The positive-electrode active material contains a lithium-containing oxide obtained by ion-exchanging part of sodium in a cobalt-containing oxide containing lithium, sodium, and titanium with lithium.

A method for manufacturing a nonaqueous electrolyte secondary battery according to the present invention relates to a method for manufacturing a nonaqueous electrolyte secondary battery including: a positive electrode containing a positive-electrode active material containing a lithium-containing oxide; a negative electrode; and a nonaqueous electrolyte. In the method for manufacturing a nonaqueous electrolyte secondary battery according to the present invention, a lithium-containing oxide is produced by ion-exchanging part of sodium in a cobalt-containing oxide containing lithium, sodium, and titanium with lithium.

In the first nonaqueous electrolyte secondary battery and the method for manufacturing a nonaqueous electrolyte secondary battery both according to the present invention, the cobalt-containing oxide is preferably a cobalt-containing oxide represented by $Li_{x1}Na_{y1}Co_\alpha M_\beta Ti_{(1-\alpha-\beta)}O_\gamma$ (where $0 \leq x1 \leq 0.1$, $0.7 \leq y1 < 1.0$, $0.70 \leq \alpha < 1.0$, $0 \leq \beta < 0.3$, $0.85 \leq \alpha+\beta < 1.0$, $1.92 \leq \gamma \leq 2.1$, and M represents a transition metal element other than Co). The lithium-containing oxide is preferably a lithium-containing oxide represented by $Li_{x2}Na_{y2}Co_\alpha M_\beta Ti_{(1-\alpha-\beta)}O_\gamma$ where $0 < x2 < 1.1$, $0.005 \leq y2 \leq 0.06$, $0.70 \leq \alpha < 1.0$, $0 \leq \beta < 0.3$, $0.85 \leq \alpha+\beta < 1.0$, $1.9 \leq \gamma \leq 2.1$, and M represents a transition metal element other than Co). In this case, in each of the cobalt-containing oxide and the lithium-containing oxide, M is preferably Mn.

In the first nonaqueous electrolyte secondary battery and the method for manufacturing a nonaqueous electrolyte secondary battery both according to the present invention, the cobalt-containing oxide is more preferably a cobalt-containing oxide represented by $Li_{x1}Na_{y1}Co_\alpha Ti_{(1-\alpha)}O_\gamma$ (where $0 \leq x1 \leq 0.1$, $0.8 \leq y1 < 1.0$, $0.85 \leq \alpha < 1.0$, and $1.9 \leq \gamma \leq 2.1$). The lithium-containing oxide is more preferably a lithium-containing oxide represented by $Li_{x2}Na_{y2}Co_\alpha Ti_{(1-\alpha)}O_\gamma$ (where $0 < x2 < 1.1$, $0.03 < y2 < 0.05$, $0.85 \leq \alpha < 1.0$, and $1.9 \leq \gamma \leq 2.1$).

In the first nonaqueous electrolyte secondary battery and the method for manufacturing a nonaqueous electrolyte secondary battery both according to the present invention, the lithium-containing oxide contained in the positive-electrode active material is one produced by ion-exchanging part of sodium contained in the cobalt-containing oxide with lithium. Therefore, the lithium-containing oxide is less likely to cause the crystal structure to break down even if a large amount of lithium is extracted from it by charging to a high potential. Hence, the battery can achieve a high capacity retention when subjected to charge-discharge cycles including charging to a high potential.

Furthermore, in the first nonaqueous electrolyte secondary battery and the method for manufacturing a nonaqueous electrolyte secondary battery both according to the present invention, the cobalt-containing oxide contains Ti. This provides a further increased capacity retention of the nonaqueous electrolyte secondary battery.

A second nonaqueous electrolyte secondary battery according to the present invention includes: a positive electrode containing a positive-electrode active material; a negative electrode; and a nonaqueous electrolyte. The positive-electrode active material contains a lithium-containing oxide containing sodium, cobalt, and titanium.

In the second nonaqueous electrolyte secondary battery according to the present invention, the positive-electrode active material is preferably a lithium-containing oxide represented by $Li_{x2}Na_{y2}Co_\alpha M_\beta Ti_{(1-\alpha-\beta)}O_\gamma$ (where $0<x2<1.1$, $0.005 \leq y2 \leq 0.06$, $0.70 \leq \alpha < 1.0$, $0 \leq \beta < 0.3$, $0.85 \leq \alpha+\beta < 1.0$, $1.9 \leq \gamma \leq 2.1$, and M represents a transition metal element other than Co). In this case, M is preferably Mn.

In the second nonaqueous electrolyte secondary battery according to the present invention, the positive-electrode active material is more preferably a lithium-containing oxide represented by $Li_{x2}Na_{y2}Co_\alpha Ti_{(1-\alpha)}O_\gamma$ (where $0<x2<1.1$, $0.03<y2<0.05$, $0.85 \leq \alpha < 1.0$, and $1.9 \leq \gamma \leq 2.1$).

Since Ti is contained in the lithium-containing oxide, the crystal structure of the lithium-containing oxide is stabilized. Therefore, the lithium-containing oxide is less likely to break down even during charging and discharging. Hence, the nonaqueous electrolyte secondary battery can be increased in capacity retention.

Furthermore, the lithium-containing oxide in the second nonaqueous electrolyte secondary battery according to the present invention can be produced by ion-exchanging part of sodium in a cobalt-containing oxide containing lithium, sodium, and titanium with lithium. Therefore, the second nonaqueous electrolyte secondary battery according to the present invention can be produced to have a high capacity retention.

The following reasons can be given for high capacity retention due to the cobalt-containing oxide containing Ti.

Cobalt-containing oxides containing no Ti cannot have relatively high Na content. The Na content in a cobalt-containing oxide containing no Ti is generally not more than 0.8% by mole. If a lithium-containing oxide is produced by ion-exchanging part of sodium in such a cobalt-containing oxide having a low Na content and containing no Ti with lithium, a larger amount of lithium than the amount of sodium to be ion-exchanged are inserted into the lithium-containing oxide by ion exchange. In short, the alkali metal content increases after the ion exchange as compared to before the ion exchange. Therefore, the lithium-containing oxide is likely to cause a structural defect during ion exchange. It can be considered that the structural defect decreases the capacity retention of the nonaqueous electrolyte secondary battery.

In contrast, in the present invention, a cobalt-containing oxide containing Ti is used to produce a lithium-containing oxide. Therefore, the Na content in the cobalt-containing oxide can be relatively high, such as not less than 0.7% by mole or not less than 0.8% by mole. Since as just described the Na content in the cobalt-containing oxide is relatively high, this can reduce the change in the total amount of Li and Na between before and after ion exchange of part of sodium in the cobalt-containing oxide with lithium. It can be considered that, therefore, the crystal structure is less likely to break down during ion exchange and the occurrence of structural defects in the lithium-containing oxide can be reduced. Thus, the battery can achieve a high capacity retention.

As seen from the above, the Na content (y1) in the cobalt-containing oxide is preferably not less than 0.7 and more preferably not less than 0.8. However, if y1 is too large, the stability of the cobalt-containing oxide is reduced, which may result in reduced stability of the resultant lithium-containing oxide. Therefore, Y1 is preferably less than 1.0.

The cobalt-containing oxide may contain Li or may not contain Li. However, if the Li content (x1) in the cobalt-containing oxide is too large, the structural stability of the resultant lithium-containing oxide during charging and discharging is reduced, which may result in reduced capacity retention. Therefore, X1 is preferably not more than 0.1.

From the viewpoint of further increasing the structural stability of the lithium-containing oxide during charging and discharging, at least part of the lithium-containing oxide preferably belongs to space group $P6_3mc$. More preferably, substantially the entire lithium-containing oxide belongs to space group $P6_3mc$. In the present invention, however, the entire lithium-containing oxide may not necessary belong to space group $P6_3mc$ and part of the lithium-containing oxide may belong to another space group. In lithium-containing oxides, the ion distribution around Ti in the crystal is different from that around Co. Therefore, crystals belonging to space group $P6_3mc$ in a lithium-containing oxide have different local structures between when containing Ti and when containing no Ti. Therefore, the lithium-containing oxide containing Ti is different in crystallite size from the lithium-containing oxide containing no Ti even if they are produced by the same synthesis method. Lithium-containing oxides are different in crystallite size also depending on the Ti content. Furthermore, they are different in crystallite size also when produced by different synthesis methods.

Therefore, from the viewpoint of further increasing the effect of stabilizing the crystal structure of the lithium-containing oxide by containing Ti therein, the crystallite size of crystals belonging to space group $P6_3mc$ in the lithium-containing oxide is preferably 250 to 450 Angstrom, both inclusive, and more preferably 370 to 410 Angstrom, both inclusive.

The positive-electrode active material may contain, in addition to the above lithium-containing oxide, another or other lithium-containing oxides, such as belonging to space group R-3m, C2/m or C2/c. Specific examples of other lithium-containing oxides include $LiCoO_2$ belonging to space group R-3m, $Li_2MnO_3$ belonging to space group C2/m or C2/c, those in which part of manganese in $Li_2MnO_3$ is substituted with a different metal, and a solid solution of $Li_{1.2}Mn_{0.54}Ni_{0.13}Co_{0.13}O_2$ and $Li_2MnO_3$.

In the present invention, however, the positive-electrode active material preferably contains 80% or more by mole lithium-containing oxide obtained by ion-exchanging part of sodium in a cobalt-containing oxide represented by $Li_{x1}Na_{y1}Co_\alpha M_\beta Ti_{(1-\alpha-\beta)}O_\gamma$ (where $0 \leq x1 \leq 0.1$, $0.7 \leq y1 < 1.0$, $0.70 \leq \alpha < 1.0$, $0 \leq \beta < 0.3$, $0.85 \leq \alpha+\beta < 1.0$, $1.9 \leq \gamma \leq 2.1$, and M represents a transition metal element other than Co) with lithium.

From the viewpoint of obtaining a lithium-containing oxide belonging to space group $P6_3mc$, the preferred cobalt-containing oxide used is a cobalt-containing oxide at least partly belonging to space group $P6_3/mmc$ and the more preferred is a cobalt-containing oxide substantially entirely belonging to space group $P6_3/mmc$.

In the lithium-containing oxide, the Li content (x2) is preferably 0 to 1.1, both exclusive. If x2 is too large, the capacity retention may be reduced.

In the lithium-containing oxide, the Na content (y2) is preferably $0.005 \leq y2 \leq 0.06$, more preferably $0.01 < y2 < 0.06$, and still more preferably $0.03 < y2 < 0.05$. If the Na content is too small, the lithium-containing oxide is structurally unstable, which may result in reduced capacity retention. If the Na content is too large, the Li content is correspondingly excessively reduced, which may deteriorate the battery characteristics. Particularly, if the lithium-containing oxide contains no Mn, the Na content is preferably $0.03 < y2 < 0.05$.

If oxygen or cobalt contained in the cobalt-containing oxide and lithium-containing oxide is too much or too little, this presents a problem in that the crystal structure of the cobalt-containing oxide or lithium-containing oxide cannot be kept stable. Therefore, the cobalt content is preferably $0.70 \leq \alpha < 1.0$ and more preferably $0.85 \leq \alpha < 1.0$. $\gamma$ is preferably within the range of $2 \pm 0.1$.

In the present invention, no particular limitation is placed on the process for ion-exchanging Na with Li. Examples of the process for ion-exchanging Na with Li include a process for adding to the cobalt-containing oxide a bed of at least one molten lithium salt selected from the group consisting of lithium nitrate, lithium sulfate, lithium chloride, lithium carbonate, lithium hydroxide, lithium iodide, lithium bromide, and lithium fluoride, and a process for immersing the cobalt-containing oxide into a solution containing at least one of the above lithium salts.

In the present invention, no particular limitation is placed on the type of the positive electrode so long as it contains a positive-electrode active material defined by the present invention. For example, the positive electrode may be one which includes a current collector formed of a piece of conductive foil, such as metal foil or alloy foil, and a positive-electrode active material layer formed on the surface of the current collector and in which the positive-electrode active material layer contains a positive-electrode active material defined by the present invention. The positive-electrode active material layer may contain, in addition to the positive-electrode active material defined by the present invention, other materials, such as a binder and an electronic conductor.

Examples of the binder to be added to the positive-electrode active material layer include polytetrafluoroethylene, poly(vinylidene fluoride), polyethylene oxide, polyvinyl acetate, polymethacrylate, polyacrylate, polyacrylonitrile, polyvinyl alcohol, styrene-butadiene rubber, and carboxymethyl cellulose. These binders may be used alone or in combination of two or more.

If the binder content in the positive-electrode active material layer is large, the positive-electrode active material content in the positive-electrode active material layer is too small and thus the resultant secondary battery may not achieve a high energy density. Therefore, the binder content in the positive-electrode active material layer is preferably 0% to 30% by mass, both inclusive, more preferably 0% to 20% by mass, both inclusive, and still more preferably 0% to 10% by mass, both inclusive.

If the electrical conductivity of the positive-electrode active material is high, an electronic conductor does not necessarily have to be added to the positive-electrode active material layer. On the other hand, if the electrical conductivity of the positive-electrode active material is low, it is preferred to add an electronic conductor to the positive-electrode active material layer. Examples of the electronic conductor to be added to the positive-electrode active material layer include carbon, conductive oxides, conductive carbides, and conductive nitrides. Specific examples of conductive oxides include tin oxide and indium oxide. Examples of conductive carbides include tungsten carbide and zirconium carbide. Examples of conductive nitrides include titanium nitride and tantalum nitride.

In adding an electronic conductor to the positive-electrode active material layer, if the additive amount of electronic conductor is too small, the electrical conductivity of the positive-electrode active material layer may not sufficiently be improved. On the other hand, if the additive amount of electronic conductor is too large, the positive-electrode active material content in the positive-electrode active material layer is too small and thus the resultant secondary battery may not achieve a high energy density. Therefore, the electronic conductor content in the positive-electrode active material layer is preferably 0% to 30% by mass, both inclusive, more preferably 0% to 20% by mass, both inclusive, and still more preferably 0% to 10% by mass, both inclusive.

In the present invention, no particular limitation is placed on the type of the negative electrode. The negative electrode may be one containing a negative-electrode active material, such as lithium, silicon, carbon, tin, germanium, aluminum, lead, indium, gallium, lithium-containing alloys, silicon-based alloys, and carbon materials and silicon materials containing lithium previously stored therein. The negative electrode may include a negative electrode current collector and a negative-electrode active material layer formed on the negative electrode current collector. Like the above positive-electrode active material layer, the negative-electrode active material layer may contain, in addition to the above negative-electrode active material, other materials, such as a binder and an electronic conductor.

In the present invention, no particular limitation is also placed on the type of the nonaqueous electrolyte. Examples of a solvent for the nonaqueous electrolyte include cyclic carbonates, chain carbonates, esters, cyclic ethers, chain ethers, nitriles, and amides. Specific examples of cyclic carbonates include ethylene carbonate, propylene carbonate, and butylene carbonate. Cyclic carbonates of these types having some or all of their respective hydrogen groups fluorinated can also be used as solvents for the nonaqueous electrolyte. Specific examples of cyclic carbonates having some or all of their respective hydrogen groups fluorinated include trifluoropropylene carbonate and fluoroethylene carbonate. Specific examples of chain carbonates include dimethyl carbonate, ethyl methyl carbonate, diethyl carbonate, methyl propyl carbonate, ethyl propyl carbonate, and methyl isopropyl carbonate. Chain carbonates of these types having some or all of their respective hydrogen groups fluorinated can also be used as solvents for the nonaqueous electrolyte. Specific examples of esters include methyl acetate, ethyl acetate, propyl acetate, methyl propionate, ethyl propionate, and $\gamma$-butyrolactone. Specific examples of cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ether. Specific examples of chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxyethane, 1-diethoxyethane, triethylene glycol dimethyl ether, and tetraethylene glycol dimethyl. Specific examples of nitriles include acetonitrile. Specific examples of amides include dimethylformamide. A mixture of two or more of the above solvents may be used as a solvent for the nonaqueous electrolyte.

Examples of a lithium salt to be added to the nonaqueous electrolyte include $LiBF_4$, $LiPF_6$, $LiCF_3SO_3$, $LiC_4F_9SO_3$, $LiN(CF_3SO_2)_2$, $LiN(C_2F_5SO_2)_2$, $LiAsF_6$, lithium difluoro(oxalato)borate, and mixtures of two or more of them.

DETAILED DESCRIPTION OF PREFERRED EXAMPLES

The present invention will hereinafter be described in more detail by way of examples; however, it should be appreciated the present invention is not limited at all to the following examples but can be embodied in various other forms appropriately modified without changing the spirit of the invention.

Example 1

Sodium nitrate ($NaNO_3$), cobalt oxide (II III) ($Co_3O_4$), and anatase titanium oxide ($TiO_2$) were weighed appropriately and mixed. Then, the mixture was fired at 900° C. for 10 hours to produce a cobalt-containing oxide represented by the formula $Na_{8/9}Co_{8/9}Ti_{1/9}O_2$ as shown in TABLE 1 below.

Figure 1:
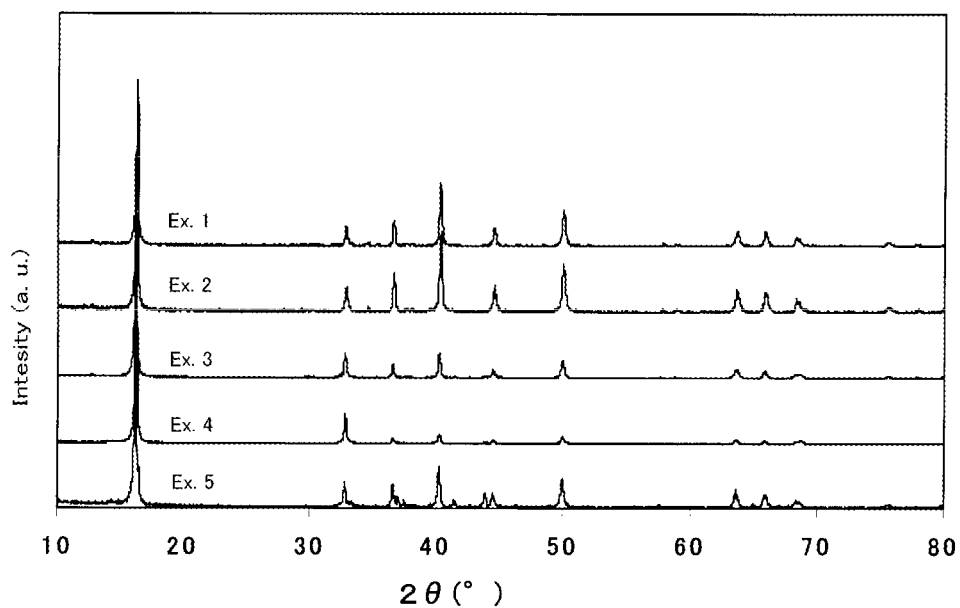
FIG. 1 is a graph showing XRD measurement results of cobalt-containing oxides in Examples 1 to 5.

XRD measurement results of the produced cobalt-containing oxide are shown in FIG. 1. The measurement results shown in FIG. 1 reveal that the resultant cobalt-containing oxide belongs to space group $P6_3/mmc$.

Note that in this Example 1, Examples 2 to 10 and Comparative Example 1, $CuK_\alpha$ was used as a radiation source for XRD measurements.

Next, part of sodium contained in the above cobalt-containing oxide was ion-exchanged with lithium using a molten salt bed made of a mixture of 61% by mole lithium nitrate ($LiNO_3$) and 39% by mole lithium hydroxide (LiOH), thereby producing a lithium-containing oxide having a composition shown in TABLE 2 below.

Specifically, first, 5 g of the cobalt-containing oxide was weighed, 5 equivalent of the molted salt bed per equivalent of the cobalt-containing oxide was added to the cobalt-containing oxide, and the mixture was held at 280° C. for 10 hours.

Thereafter, the resultant solid was rinsed in water and dried to produce a lithium-containing oxide having a composition shown in TABLE 2 below.

Note that composition analysis results shown in TABLES 1 and 2 show values obtained by measuring the contents of lithium and sodium by atomic emission spectrometry and measuring the contents of titanium and cobalt by ICP emission spectrometry. In TABLES 1 and 2, each composition ratio is represented by assuming the sum of cobalt and titanium to be 1 and oxygen to be 2.

Figure 3:
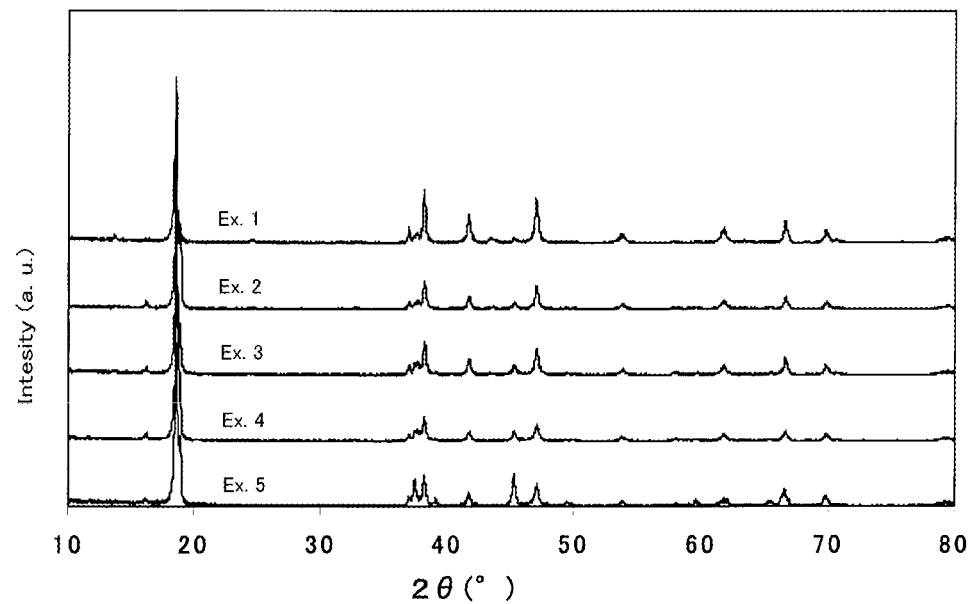
FIG. 3 is a graph showing XRD measurement results of lithium-containing oxides in Examples 1 to 5.

XRD measurement results of the produced lithium-containing oxide are shown in FIG. 3. The measurement results shown in FIG. 3 reveal that the resultant lithium-containing oxide contains a substance belonging to space group $P6_3mc$.

Figure 5:
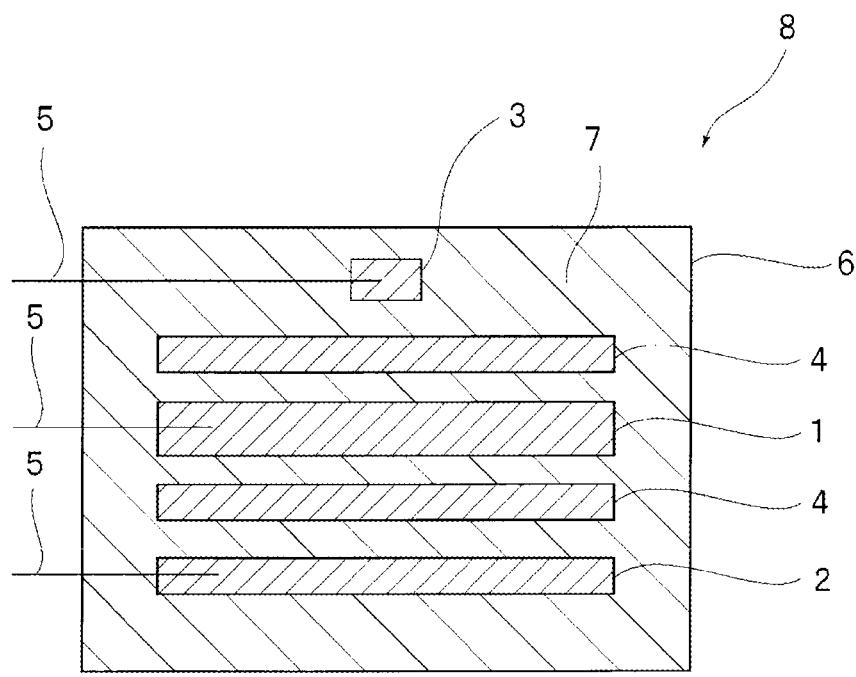
FIG. 5 is a schematic cross-sectional view of a test cell produced in Example 1.

Next, a test cell 8 shown in FIG. 5 was produced using the above lithium-containing oxide.

Specifically, first, a positive electrode was produced using the lithium-containing oxide as a positive-electrode active material. More specifically, mixed together were 80% by mass lithium-containing oxide, 10% by mass acetylene black, and 10% by mass poly(vinylidene fluoride) serving as a binder. The mixture was prepared into a slurry using N-methyl-2-pyrrolidone. The prepared slurry was applied to a piece of aluminum foil, dried in a vacuum at 110° C., and formed to produce a positive electrode 1.

Next, lithium metal was cut in a predetermined size to produce a negative electrode 2. Likewise, lithium metal was cut in a predetermined size to produce a reference electrode 3.

Then, a test cell 8 was produced, in an inert atmosphere, using the produced positive electrode 1, the produced negative electrode 2, the produced reference electrode 3, separators 4 made of polyethylene, leads 5, a laminate housing 6, and a nonaqueous electrolyte 7.

The nonaqueous electrolyte 7 used is one in which lithium hexafluorophosphate ($LiPF_6$) was added to an electrolytic solution made of a mixture of ethylene carbonate and diethyl carbonate in a ratio of 30% to 70% by volume to reach a concentration of 1.0 mol/L.

Example 2

A lithium-containing oxide and a test cell were produced in the same manner as in Example 1 except for the use of a cobalt-containing oxide represented by $Na_{11/12}Co_{11/12}Ti_{1/12}O_2$ as shown in TABLE 1 below, and the test cell was evaluated for charge/discharge characteristics.

XRD measurement results of the cobalt-containing oxide used in this example and represented by $Na_{11/12}Co_{11/12}Ti_{1/12}O_2$ are shown in FIG. 1. The measurement results shown in FIG. 1 reveal that the cobalt-containing oxide used in this example belongs to space group $P6_3/mmc$.

The lithium-containing oxide obtained in this example had a composition shown in TABLE 2 below. XRD measurement results of the lithium-containing oxide obtained in this example are shown in FIG. 3. The measurement results shown in FIG. 3 reveal that the resultant lithium-containing oxide contains a substance belonging to space group $P6_3mc$.

Example 3

A lithium-containing oxide and a test cell were produced in the same manner as in Example 1 except for the use of a cobalt-containing oxide represented by $Na_{17/18}Co_{17/18}Ti_{1/18}O_2$, and the test cell was evaluated for charge/discharge characteristics.

XRD measurement results of the cobalt-containing oxide used in this example and represented by $Na_{17/18}Co_{17/18}Ti_{1/18}$ $O_2$ are shown in FIG. 1. The measurement results shown in FIG. 1 reveal that the cobalt-containing oxide used in this example belongs to space group $P6_3/mmc$.

The lithium-containing oxide obtained in this example had a composition shown in TABLE 2 below. XRD measurement results of the lithium-containing oxide obtained in this example are shown in FIG. 3. The measurement results shown in FIG. 3 reveal that the resultant lithium-containing oxide contains a substance belonging to space group $P6_3mc$.

Example 4

A lithium-containing oxide and a test cell were produced in the same manner as in Example 1 except for the use of a cobalt-containing oxide represented by $Na_{23/24}Co_{23/24}Ti_{1/24}O_2$, and the test cell was evaluated for charge/discharge characteristics.

XRD measurement results of the cobalt-containing oxide used in this example and represented by $Na_{23/24}Co_{23/24}Ti_{1/24}O_2$ are shown in FIG. 1. The measurement results shown in FIG. 1 reveal that the cobalt-containing oxide used in this example belongs to space group $P6_3/mmc$.

The lithium-containing oxide obtained in this example had a composition shown in TABLE 2 below. XRD measurement results of the lithium-containing oxide obtained in this example are shown in FIG. 3. The measurement results shown in FIG. 3 reveal that the resultant lithium-containing oxide contains a substance belonging to space group $P6_3mc$.

Example 5

A lithium-containing oxide and a test cell were produced in the same manner as in Example 1 except for the use of a cobalt-containing oxide represented by $Na_{26/27}Co_{26/27}Ti_{1/27}O_2$, and the test cell was evaluated for charge/discharge characteristics.

XRD measurement results of the cobalt-containing oxide used in this example and represented by $Na_{26/27}Co_{26/27}Ti_{1/27}O_2$ are shown in FIG. 1. The measurement results shown in FIG. 1 reveal that the cobalt-containing oxide used in this example belongs to space group $P6_3/mmc$.

The lithium-containing oxide obtained in this example had a composition shown in TABLE 2 below. XRD measurement results of the lithium-containing oxide obtained in this example are shown in FIG. 3. The measurement results shown in FIG. 3 reveal that the resultant lithium-containing oxide contains a substance belonging to space group $P6_3mc$.

Example 6

A lithium-containing oxide and a test cell were produced in the same manner as in Example 1 except for the use of a cobalt-containing oxide represented by $Na_{0.7}Co_{8/9}Ti_{1/9}O_2$, and the test cell was evaluated for charge/discharge characteristics.

Figure 2:
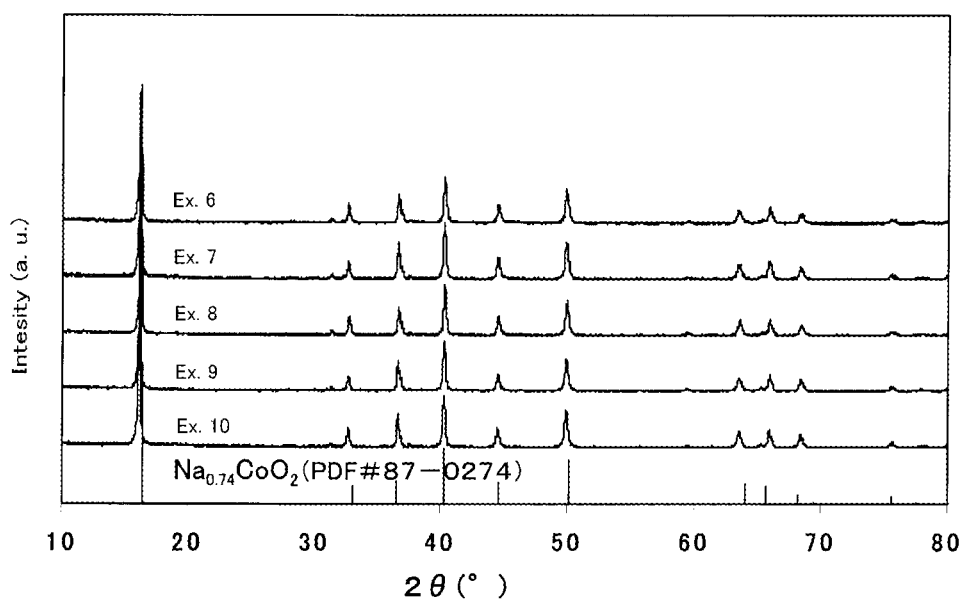
FIG. 2 is a graph showing XRD measurement results of cobalt-containing oxides in Examples 6 to 10.

XRD measurement results of the cobalt-containing oxide used in this example and represented by $Na_{0.7}Co_{8/9}Ti_{1/9}O_2$ are shown in FIG. 2. The measurement results shown in FIG. 2 reveal that the cobalt-containing oxide used in this example belongs to space group $P6_3/mmc$.

Figure 4:
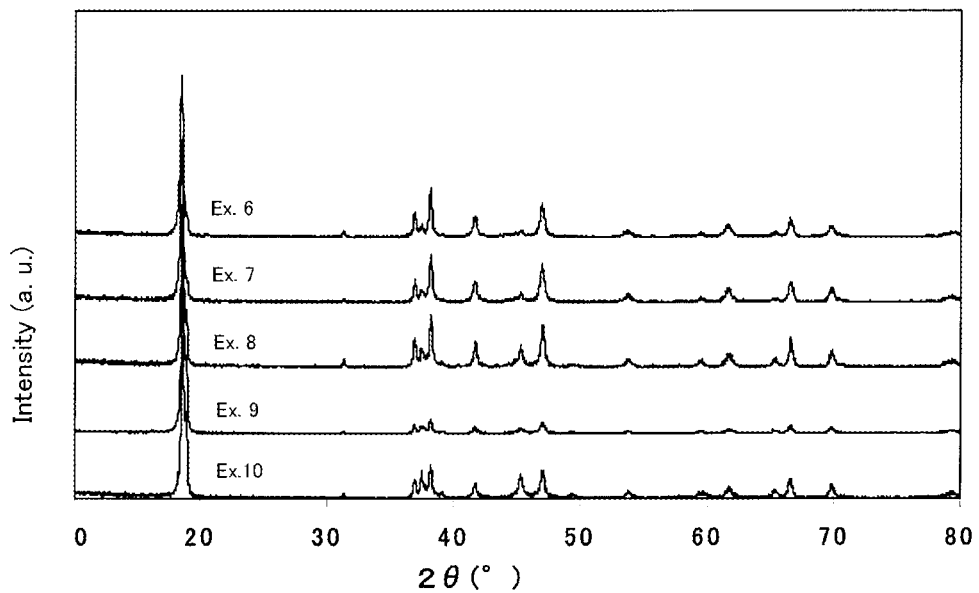
FIG. 4 is a graph showing XRD measurement results of lithium-containing oxides in Examples 6 to 10.

The lithium-containing oxide obtained in this example had a composition shown in TABLE 2 below. XRD measurement results of the lithium-containing oxide obtained in this example are shown in FIG. 4. The measurement results shown in FIG. 4 reveal that the resultant lithium-containing oxide contains a substance belonging to space group $P6_3mc$.

Example 7

A lithium-containing oxide and a test cell were produced in the same manner as in Example 1 except for the use of a cobalt-containing oxide represented by $Na_{0.7}Co_{11/12}Ti_{1/12}O_2$, and the test cell was evaluated for charge/discharge characteristics.

XRD measurement results of the cobalt-containing oxide used in this example and represented by $Na_{0.7}Co_{11/12}Ti_{1/12}O_2$ are shown in FIG. 2. The measurement results shown in FIG. 2 reveal that the cobalt-containing oxide used in this example belongs to space group $P6_3/mmc$.

The lithium-containing oxide obtained in this example had a composition shown in TABLE 2 below. XRD measurement results of the lithium-containing oxide obtained in this example are shown in FIG. 4. The measurement results shown in FIG. 4 reveal that the resultant lithium-containing oxide contains a substance belonging to space group $P6_3mc$.

Example 8

A lithium-containing oxide and a test cell were produced in the same manner as in Example 1 except for the use of a cobalt-containing oxide represented by $Na_{0.7}Co_{17/18}Ti_{1/18}O_2$, and the test cell was evaluated for charge/discharge characteristics.

XRD measurement results of the cobalt-containing oxide used in this example and represented by $Na_{0.7}Co_{17/18}Ti_{1/18}O_2$ are shown in FIG. 2. The measurement results shown in FIG. 2 reveal that the cobalt-containing oxide used in this example belongs to space group $P6_3/mmc$.

The lithium-containing oxide obtained in this example had a composition shown in TABLE 2 below. XRD measurement results of the lithium-containing oxide obtained in this example are shown in FIG. 4. The measurement results shown in FIG. 4 reveal that the resultant lithium-containing oxide contains a substance belonging to space group $P6_3mc$.

Example 9

A lithium-containing oxide and a test cell were produced in the same manner as in Example 1 except for the use of a cobalt-containing oxide represented by $Na_{0.7}Co_{23/24}Ti_{1/24}O_2$ and the test cell was evaluated for charge/discharge characteristics.

XRD measurement results of the cobalt-containing oxide used in this example and represented by $Na_{0.7}Co_{23/24}Ti_{1/24}O_2$ are shown in FIG. 2. The measurement results shown in FIG. 2 reveal that the cobalt-containing oxide used in this example belongs to space group $P6_3/mmc$.

The lithium-containing oxide obtained in this example had a composition shown in TABLE 2 below. XRD measurement results of the lithium-containing oxide obtained in this example are shown in FIG. 4. The measurement results shown in FIG. 4 reveal that the resultant lithium-containing oxide contains a substance belonging to space group $P6_3mc$.

Example 10

A lithium-containing oxide and a test cell were produced in the same manner as in Example 1 except for the use of a cobalt-containing oxide represented by $Na_{0.7}Co_{26/27}Ti_{1/27}O_2$ and the test cell was evaluated for charge/discharge characteristics.

XRD measurement results of the cobalt-containing oxide used in this example and represented by $Na_{0.7}Co_{26/27}Ti_{1/27}O_2$ are shown in FIG. 2. The measurement results shown in FIG.

2 reveal that the cobalt-containing oxide used in this example belongs to space group P6$_3$/mmc.

The lithium-containing oxide obtained in this example had a composition shown in TABLE 2 below. XRD measurement results of the lithium-containing oxide obtained in this example are shown in FIG. 4. The measurement results shown in FIG. 4 reveal that the resultant lithium-containing oxide contains a substance belonging to space group P6$_3$mc.

Comparative Example 1

A cobalt-containing oxide was produced in the same manner as in Example 1 except that it had a nominal composition shown in TABLE 1 below. Then, 5 g of the resultant cobalt-containing oxide was immersed into 150 mL of a 5 M solution of lithium bromide (LiBr) in hexanol and ion-exchanged by refluxing at 120° C. for 16 hours with the solution, thereby obtaining a lithium-containing oxide having a composition shown in TABLE 2 below.

Figure 6:
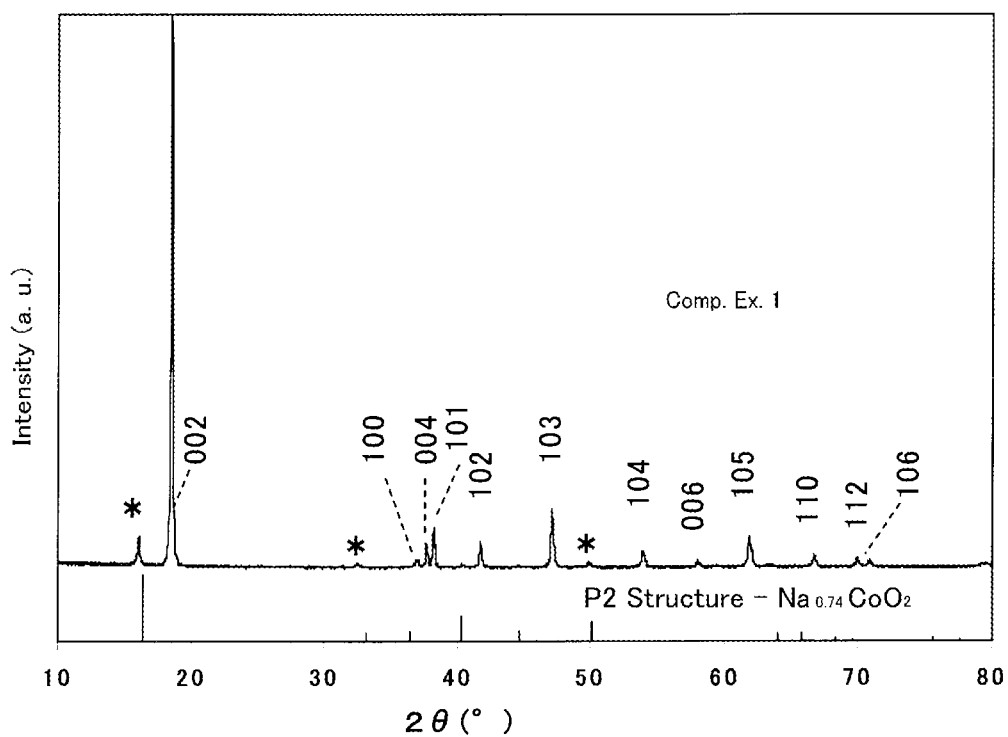
FIG. 6 is a graph showing XRD measurement results of a lithium-containing oxide in Comparative Example 1.

FIG. 6 shows XRD measurement results of the lithium-containing oxide in this comparative example. The results shown in FIG. 6 reveal that a main component of the lithium-containing oxide in this comparative example belongs to space group P6$_3$mc and a structure prior to ion exchange still remains as an impurity.

Figure 7:
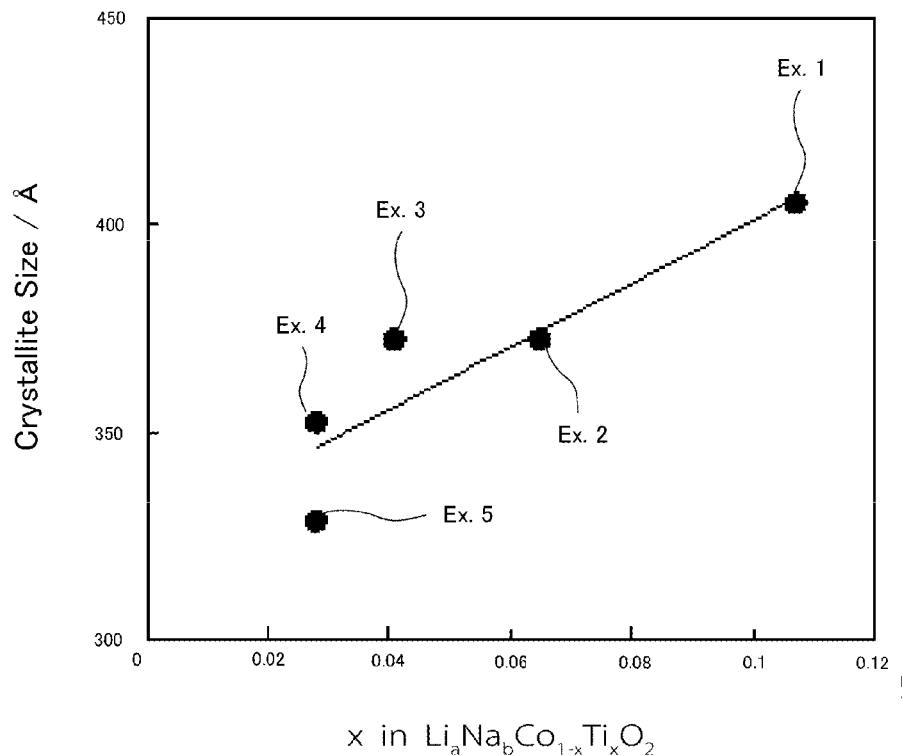
FIG. 7 is a graph showing crystallite sizes of crystals contained in the lithium-containing oxides in Examples 1 to 5.

Shown in TABLE 3 and FIG. 7 are the crystallite sizes of crystals belonging to space group P6$_3$mc in the lithium-containing oxides of Examples 1 to 5. Each crystallite size was determined by calculating the full width at half maximum of the 002 diffraction peak observed near 2θ=18.5° in the corresponding XRD profile shown in FIG. 3 and substituting the calculated value into the following Scherrer equation:

$$D = K\lambda / \beta \cos(\theta)$$

Figure 8:
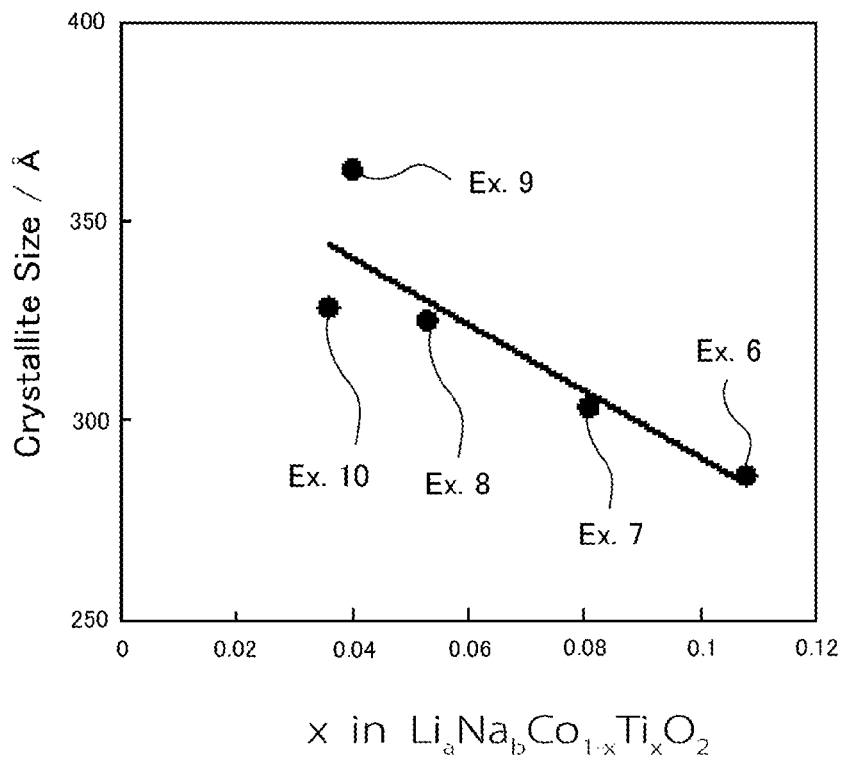
FIG. 8 is a graph showing crystallite sizes of crystals contained in the lithium-containing oxides in Examples 6 to 10.

D: crystallite size
K: Scherrer constant (K=0.94)
λ: wavelength of CuK$_\alpha$ radiation
β: full width at half maximum (unit: radian)
θ: Bragg angle of diffraction line Shown in TABLE 3 and FIG. 8 are the crystallite sizes of crystals belonging to space group P6$_3$mc in the lithium-containing oxides of Examples 6 to 10. Each crystallite size was determined by calculating the full width at half maximum of the 002 diffraction peak observed near 2θ=18.5° in the corresponding XRD profile shown in FIG. 4 and substituting the calculated value into the above Scherrer equation.

TABLE 3 also shows the crystallite size of crystals belonging to space group P6$_3$mc in the lithium-containing oxide of Comparative Example 1. The crystallite size was determined by calculating the full width at half maximum of the 002 diffraction peak observed near 2θ=18.5° in the corresponding XRD profile shown in FIG. 6 and substituting the calculated value into the above Scherrer equation.

TABLE 1

| | Cobalt-Containing Oxide | | |
|---|---|---|---|
| | Nominal Composition | Composition Analysis Results | Space Group |
| Ex. 1 | Na$_{8/9}$Co$_{8/9}$Ti$_{1/9}$O$_2$ | Na$_{0.896}$Co$_{0.889}$Ti$_{0.111}$O$_2$ | P6$_3$/mmc |
| Ex. 2 | Na$_{11/12}$Co$_{11/12}$Ti$_{1/12}$O$_2$ | Na$_{0.839}$Co$_{0.931}$Ti$_{0.069}$O$_2$ | P6$_3$/mmc |
| Ex. 3 | Na$_{17/18}$Co$_{17/18}$Ti$_{1/18}$O$_2$ | Na$_{0.829}$Co$_{0.959}$Ti$_{0.041}$O$_2$ | P6$_3$/mmc |
| Ex. 4 | Na$_{23/24}$Co$_{23/24}$Ti$_{1/24}$O$_2$ | Na$_{0.821}$Co$_{0.970}$Ti$_{0.030}$O$_2$ | P6$_3$/mmc |
| Ex. 5 | Na$_{26/27}$Co$_{26/27}$Ti$_{1/27}$O$_2$ | Na$_{0.838}$Co$_{0.971}$Ti$_{0.029}$O$_2$ | P6$_3$/mmc |
| Ex. 6 | Na$_{0.7}$Co$_{8/9}$Ti$_{1/9}$O$_2$ | Na$_{0.719}$Co$_{0.889}$Ti$_{0.111}$O$_2$ | P6$_3$/mmc |
| Ex. 7 | Na$_{0.7}$Co$_{11/12}$Ti$_{1/12}$O$_2$ | Na$_{0.711}$Co$_{0.916}$Ti$_{0.084}$O$_2$ | P6$_3$/mmc |
| Ex. 8 | Na$_{0.7}$Co$_{17/18}$Ti$_{1/18}$O$_2$ | Na$_{0.703}$Co$_{0.946}$Ti$_{0.054}$O$_2$ | P6$_3$/mmc |
| Ex. 9 | Na$_{0.7}$Co$_{23/24}$Ti$_{1/24}$O$_2$ | Na$_{0.704}$Co$_{0.959}$Ti$_{0.041}$O$_2$ | P6$_3$/mmc |
| Ex. 10 | Na$_{0.7}$Co$_{26/27}$Ti$_{1/27}$O$_2$ | Na$_{0.707}$Co$_{0.963}$Ti$_{0.037}$O$_2$ | P6$_3$/mmc |
| Comp. Ex. 1 | Na$_{0.7}$CoO$_2$ | — | — |

TABLE 2

| | Lithium-Containing Oxide | |
|---|---|---|
| | Composition Analysis Results | Space Group |
| Ex. 1 | Li$_{0.985}$Na$_{0.030}$Co$_{0.893}$Ti$_{0.107}$O$_2$ | P6$_3$mc |
| Ex. 2 | Li$_{0.947}$Na$_{0.036}$Co$_{0.935}$Ti$_{0.065}$O$_2$ | P6$_3$mc |
| Ex. 3 | Li$_{0.917}$Na$_{0.043}$Co$_{0.959}$Ti$_{0.041}$O$_2$ | P6$_3$mc |
| Ex. 4 | Li$_{0.922}$Na$_{0.044}$Co$_{0.972}$Ti$_{0.028}$O$_2$ | P6$_3$mc |
| Ex. 5 | Li$_{0.936}$Na$_{0.041}$Co$_{0.972}$Ti$_{0.028}$O$_2$ | P6$_3$mc |
| Ex. 6 | Li$_{0.845}$Na$_{0.020}$Co$_{0.892}$Ti$_{0.108}$O$_2$ | P6$_3$mc |
| Ex. 7 | Li$_{0.850}$Na$_{0.020}$Co$_{0.919}$Ti$_{0.081}$O$_2$ | P6$_3$mc |
| Ex. 8 | Li$_{0.861}$Na$_{0.022}$Co$_{0.947}$Ti$_{0.053}$O$_2$ | P6$_3$mc |
| Ex. 9 | Li$_{0.841}$Na$_{0.025}$Co$_{0.960}$Ti$_{0.040}$O$_2$ | P6$_3$mc |
| Ex. 10 | Li$_{0.869}$Na$_{0.024}$Co$_{0.964}$Ti$_{0.036}$O$_2$ | P6$_3$mc |
| Comp. Ex. 1 | Li$_{0.870}$Na$_{0.056}$CoO$_2$ | P6$_3$mc |

TABLE 3

| | Crystallite Size (Å) |
|---|---|
| Ex. 1 | 405 |
| Ex. 2 | 372 |
| Ex. 3 | 372 |
| Ex. 4 | 352 |
| Ex. 5 | 328 |
| Ex. 6 | 286 |
| Ex. 7 | 303 |
| Ex. 8 | 325 |
| Ex. 9 | 363 |
| Ex. 10 | 328 |
| Comp. Ex. 1 | 491 |

(Charge-Discharge Test)

Each of the test cells produced in Examples 1 to 10 underwent a charge-discharge test by charging and discharging it within the range of 3.2 V to 4.8 V (vs. Li/Li$^+$) with a current density of 0.1 mA/cm$^3$. An initial discharge capacity density and a 10th cycle capacity retention were obtained from the test results.

Furthermore, the test cell produced in Comparative Example 1 underwent a charge-discharge test in the same manner except for charging and discharging within the range of 2.0 V to 4.6 V (vs. Li/Li$^+$) with a current density of 2 mA/cm$^3$. An initial discharge capacity density and a 10th cycle capacity retention were obtained from the test results.

Note that the initial discharge capacity density and the 10th cycle capacity retention do not depend on the current density.

Furthermore, in the charge-discharge tests for Examples 1 to 10 the test cells were charged to 4.8 V (vs. Li/Li$^+$), whereas in the charge-discharge test for Comparative Example 1 the test cell was charged to 4.6 V (vs. Li/Li$^+$). A battery will be more likely to degrade when charged to higher potential. Therefore, the conditions of the charge-discharge tests for Examples 1 to 10 are conditions more likely to cause the battery to degrade than those of the charge-discharge test for Comparative Example 1.

The test results are tabulated in TABLE 4 below.

TABLE 4

|  | Initial Discharge Capacity Density (mAh/g) | 10th Cycle Capacity Retention (%) |
|---|---|---|
| Ex. 1 | 201 | 83 |
| Ex. 2 | 211 | 81 |
| Ex. 3 | 211 | 82 |
| Ex. 4 | 211 | 85 |
| Ex. 5 | 209 | 84 |
| Ex. 6 | 178 | 78 |
| Ex. 7 | 188 | 78 |
| Ex. 8 | 199 | 78 |
| Ex. 9 | 199 | 79 |
| Ex. 10 | 202 | 78 |
| Comp. Ex. 1 | 213 | 76 |

The results shown in TABLE 4 reveal that Examples 1 to 10 using cobalt-containing oxides containing Ti have higher 10th cycle capacity retentions than Comparative Example using a cobalt-containing oxide containing no Ti.

The results also reveal that Examples 1 to 10 in which the crystallite size of crystals belonging to space group P6$_3$mc in the lithium-containing oxide is within the range from 250 to 450 Angstrom have higher 10th cycle capacity retentions than Comparative Example 1 in which the crystallite size thereof is 491 Angstrom. This phenomenon can be explained as follows: In a positive electrode having a structure of space group P6$_3$mc, large amounts of lithium is inserted into and released from it during discharging and charging, respectively. At a fully charged state, a substantially full amount of lithium is released from the positive electrode, so that the positive electrode undergoes large stress. Since the electrodes in Examples 1 to 10 have appropriate crystallite size, the stress can be relaxed.

Furthermore, comparisons between examples having equal theoretical discharge capacity densities, such as between Examples 1 and 6, between Examples 2 and 7, between Examples 3 and 8, between Examples 4 and 9, and Examples between 5 and 10, reveal that if the ratio of Na in the cobalt-containing oxide is not less than 0.8, the capacity retention can be further increased.

Examples 11 to 16 and Comparative Examples 2 and 3

Lithium-containing oxides and test cells were produced in the same manner as in Example 1 except for the use of cobalt-containing oxides produced using manganese oxide III (Mn$_3$O$_4$) as a manganese source in accordance with the nominal compositions shown in TABLE 5 below, and the test cells were evaluated for charge/discharge characteristics.

Figure 9:
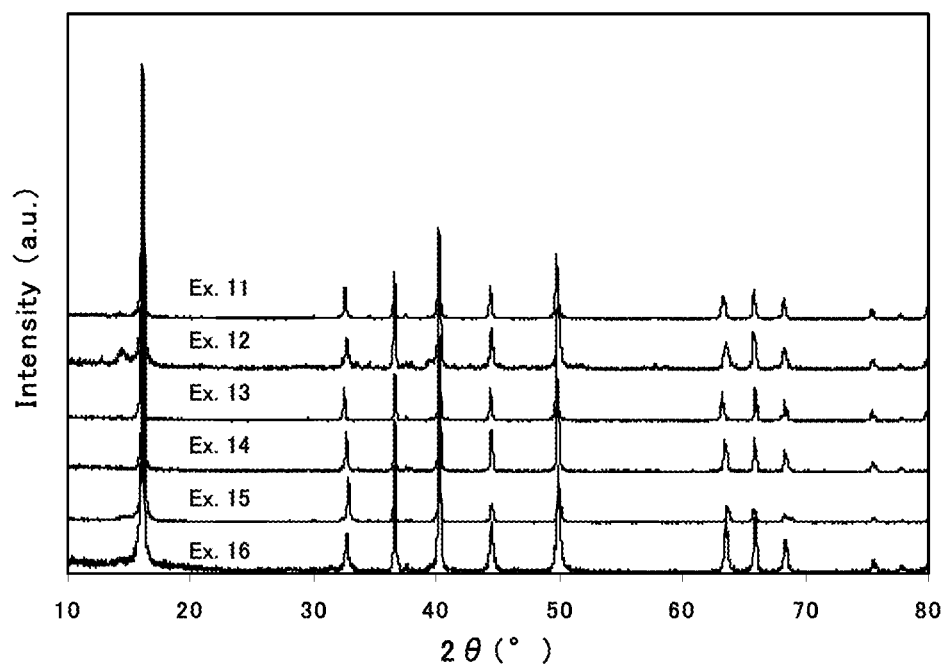
FIG. 9 is a graph showing XRD measurement results of cobalt-containing oxides in Examples 11 to 16.

XRD measurement results of the cobalt-containing oxides of Examples 11 to 16 before being subjected to ion exchange are shown in FIG. 9, and composition analysis results thereof are shown in TABLE 5. The measurement results shown in FIG. 9 reveal that the cobalt-containing oxides used in these examples belong to space group P6$_3$/mmc.

Figure 11:
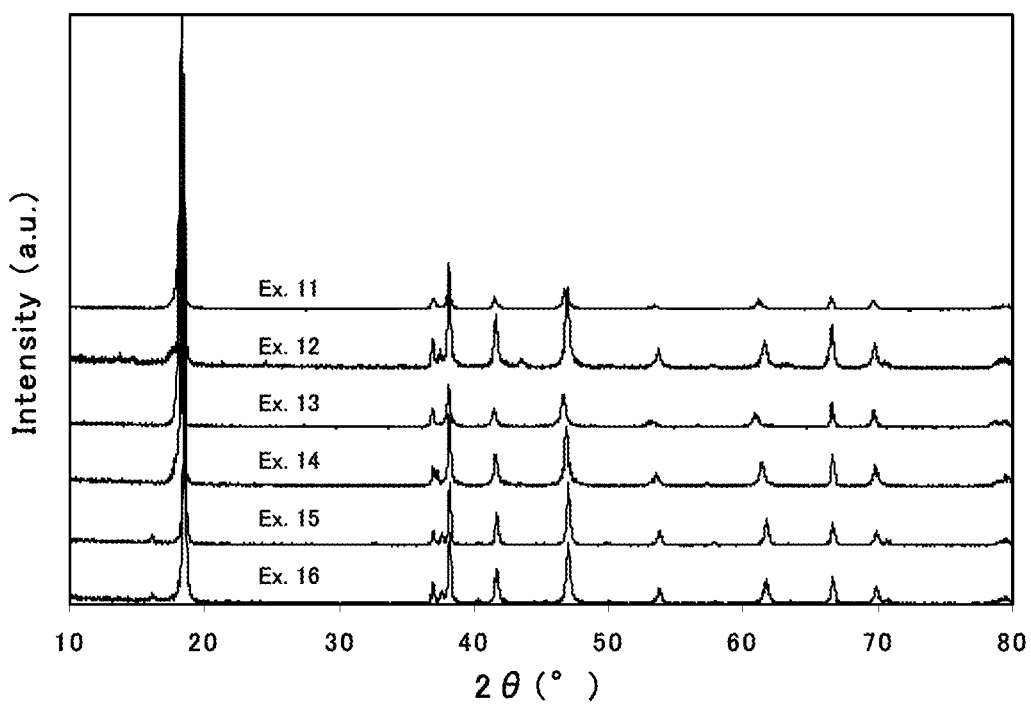
FIG. 11 is a graph showing XRD measurement results of lithium-containing oxides in Examples 11 to 16.

XRD measurement results of the lithium-containing oxides obtained in these examples after being subjected to ion exchange are shown in FIG. 11, and the composition analysis results thereof are shown in TABLE 6. The measurement results shown in FIG. 11 reveal that the resultant lithium-containing oxides contain their respective substances belonging to space group P6$_3$mc.

Comparative Example 2

Figure 10:
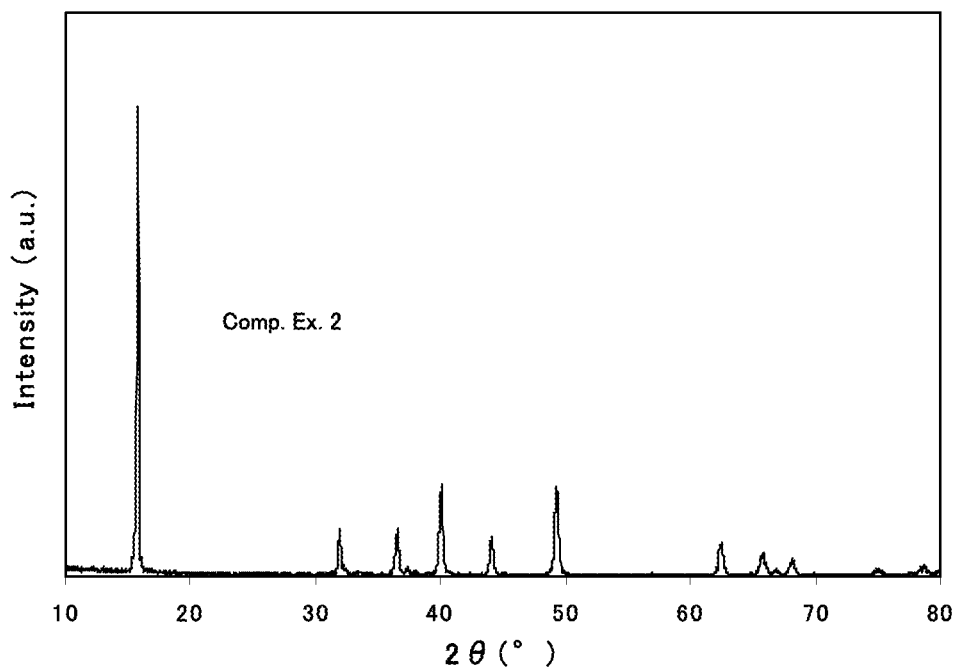
FIG. 10 is a graph showing XRD measurement results of a cobalt-containing oxide in Comparative Example 2.

XRD measurement results of the cobalt-containing oxide in Comparative Example 2 are shown in FIG. 10. The measurement results shown in FIG. 10 reveal that the yet-to-be-ion-exchanged cobalt-containing oxide used in this comparative example belongs to space group P6$_3$/mmc. A composition analysis result of the cobalt-containing oxide in Comparative Example 2 before being subjected to ion exchange is shown in TABLE 5.

Figure 12:
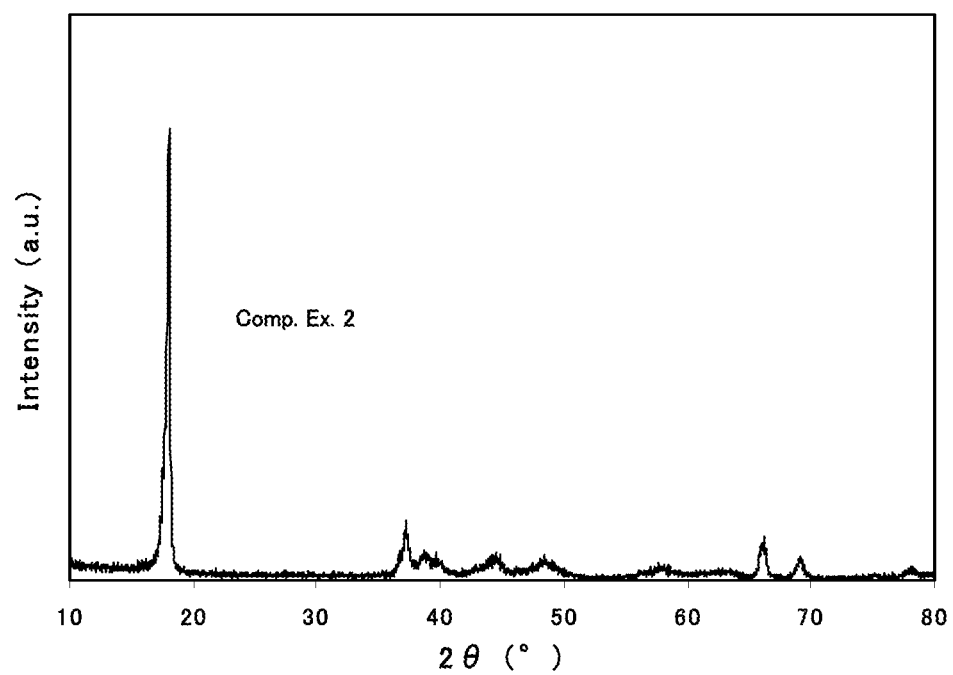
FIG. 12 is a graph showing XRD measurement results of a lithium-containing oxide in Comparative Example 2.

FIG. 12 shows XRD measurement results of the lithium-containing oxide obtained after ion exchange in this comparative example. The results shown in FIG. 12 reveal that a main component of the lithium-containing oxide of Comparative Example 2 belongs to space group P6$_3$mc.

(Charge-Discharge Test)

Each of the test cells produced in Examples 11 to 16 underwent a charge-discharge test by charging and discharging it within the range of 3.2 V to 4.8 V (vs. Li/Li$^+$) with a current density of 0.1 mA/cm$^3$. An initial discharge capacity density and a 10th cycle capacity retention were obtained from the test results. The results are shown in TABLE 7.

TABLE 5

|  | Nominal Composition | Composition Analysis Results | Space Group |
|---|---|---|---|
| Ex. 11 | Na7/9Co7/9Mn1/9Ti1/9O2 | Na0.791Co0.77Mn0.115Ti0.115O2 | P6$_3$/mmc |
| Ex. 12 | Na71/81Co71/81Mn1/81Ti1/9O2 | Na0.905Co0.879Mn0.013Ti0.108O2 | P6$_3$/mmc |
| Ex. 13 | Na20/27Co20/27Mn6/27Ti1/27O2 | Na0.751Co0.74Mn0.224Ti0.036O2 | P6$_3$/mmc |
| Ex. 14 | Na23/27Co23/27Mn3/27Ti1/27O2 | Na0.856Co0.85Mn0.113Ti0.037O2 | P6$_3$/mmc |
| Ex. 15 | Na77/81Co77/81Mn1/81Ti1/27O2 | Na0.988Co0.951Mn0.012Ti0.036O2 | P6$_3$/mmc |
| Ex. 16 | Na0.7Co77/81Mn1/81Ti1/27O2 | Na0.728Co0.95Mn0.012Ti0.037O2 | P6$_3$/mmc |
| Comp. Ex. 2 | Na6/9Co6/9Mn2/9Ti1/9O2 | Na0.686Co0.667Mn0.221Ti0.112O2 | P6$_3$/mmc |
| Comp. Ex. 3 | Na0.7Co4/9Mn4/9Ti1/9O2 | Na0.726Co0.444Mn0.444Ti0.111O2 | P6$_3$/mmc |

TABLE 6

|  | Composition Analysis Results | Space Group |
|---|---|---|
| Ex. 11 | Li0.841Na0.024Co0.776Mn0.112Ti0.112O2 | P6$_3$mc |
| Ex. 12 | Li0.932Na0.04Co0.89Mn0.013Ti0.097O2 | P6$_3$mc |

TABLE 6-continued

| | Composition Analysis Results | Space Group |
|---|---|---|
| Ex. 13 | Li0.766Na0.008Co0.74Mn0.224Ti0.036O2 | P6$_3$mc |
| Ex. 14 | Li0.854Na0.027Co0.852Mn0.112Ti0.036O2 | P6$_3$mc |
| Ex. 15 | Li0.922Na0.038Co0.954Mn0.012Ti0.033O2 | P6$_3$mc |
| Ex. 16 | Li0.873Na0.046Co0.951Mn0.012Ti0.037O2 | P6$_3$mc |
| Comp. Ex. 2 | Li0.714Na0.012Co0.662Mn0.226Ti0.112O2 | P6$_3$mc |
| Comp. Ex. 3 | Li0.634Na0.04Co0.446Mn0.446Ti0.107O2 | Cmca |

TABLE 7

| | Initial Discharge Capacity Density (mAh/g) | 10th Cycle Capacity Retention (%) |
|---|---|---|
| Ex. 11 | 181 | 88 |
| Ex. 12 | 197 | 83 |
| Ex. 13 | 189 | 91 |
| Ex. 14 | 209 | 91 |
| Ex. 15 | 226 | 88 |
| Ex. 16 | 202 | 84 |

(Charge-Discharge Test for Comparative Example 2)

The test cell produced in Comparative Example 2 underwent a charge-discharge test by charging and discharging it within the range of 3.2 V to 4.8 V (vs. Li/Li$^+$) with a current density of 0.1 mA/cm$^3$. An initial discharge capacity density was obtained from the test results. As a result, in Comparative Example 2, the initial discharge capacity density was 112 mAh/g, whereby a sufficient capacity could not be achieved. This unsatisfactory discharge capacity density can be due to effects of the sample composition.

Note that the initial discharge capacity density and the 10th cycle capacity retention do not depend on the current density. Furthermore, in the charge-discharge tests for Examples 1 to 10 the test cells were charged to 4.8 V (vs. Li/Li$^+$), whereas in the charge-discharge test for Comparative Example 1 the test cell was charged to 4.6 V (vs. Li/Li$^+$). A battery will be more likely to degrade when charged to higher potential. Therefore, the conditions of the charge-discharge tests for Examples 1 to 10 are conditions more likely to cause the battery to degrade than those of the charge-discharge test for Comparative Example 1. Moreover, if positive-electrode active materials have equivalent discharge capacity densities, those capable of being discharged to higher potentials are more advantageous in increasing the energy density. Therefore, the preferred positive electrode material is one capable of achieving a high discharge capacity density at a discharge cut-off voltage of 3.0 V (vs. Li/Li$^+$) or more, and the more preferred is one capable of achieving a high discharge capacity density at a discharge cut-off voltage of 3.2 V (vs. Li/Li$^+$) or more.

The invention claimed is:

1. A nonaqueous electrolyte secondary battery comprising: a positive electrode containing a positive-electrode active material; a negative electrode; and a nonaqueous electrolyte, wherein the positive-electrode active material contains a lithium-containing oxide represented by $Li_{x2}Na_{y2}Co_\alpha Ti_{(1-\alpha-\beta)}O_\gamma$ (where $0<x2<1.1$, $0.005 \leq y2 \leq 0.06$, $0.70 \leq \alpha < 1.0$, $0 \leq \beta < 0.3$, $0.85 \leq \alpha+\beta < 1.0$, and $1.9 \leq \gamma \leq 2.1$),
wherein the lithium-containing oxide is obtained by ion-exchanging, with lithium, part of sodium in a cobalt-containing oxide containing sodium and titanium, and
wherein the cobalt-containing oxide is represented by $Li_{x1}Na_{y1}Co_\alpha Mn_\beta Ti_{(1-\alpha-\beta)}O_\gamma$ (where $0 \leq x1 \leq 0.1$, $0.7 \leq y1 < 1.0$, $0.70 \leq \alpha < 1.0$, $0 \leq \beta < 0.3$, $0.85 < \alpha+\beta < 1.0$, and $1.9 \leq \gamma \leq 2.10$, and wherein at least part of the cobalt-containing oxide has a crystal structure belonging to space group P6$_3$/mmc.

2. A nonaqueous electrolyte secondary battery comprising: a positive electrode containing a positive-electrode active material; a negative electrode; and a nonaqueous electrolyte, wherein the positive-electrode active material contains a lithium-containing oxide represented by $Li_{x2}Na_{y2}Co_\alpha Mn_\beta Ti_{(1-\alpha-\beta)}O_\gamma$ (where $0<x2<1.1$, $0.005 \leq y2 \leq 0.06$, $0.70 \leq \alpha < 1.0$, $0 \leq \beta < 0.3$, $0.85 \leq \alpha+\beta < 1.0$, and $1.9 \leq \gamma \leq 2.1$),
wherein the lithium-containing oxide is obtained by ion-exchanging, with lithium, part of sodium in a cobalt-containing oxide containing sodium and titanium, and
wherein the cobalt-containing oxide is represented by $Li_{x1}Na_{y1}Co_\alpha Mn_\beta Ti_{(1-\alpha-\beta)}O_\gamma$ (where $0 \leq x1 \leq 0.1$, $0.7 \leq y1 < 1.0$, $0.70 \leq \alpha < 1.0$, $0 \leq \beta < 0.3$, $0.85 \leq \alpha+\beta < 1.0$, and $1.9 \leq \gamma \leq 2.1$), and
wherein at least part of the lithium-containing oxide has a crystal structure belonging to space group P6$_3$mc.

3. A nonaqueous electrolyte secondary battery comprising: a positive electrode containing a positive-electrode active material; a negative electrode; and a nonaqueous electrolyte, wherein the positive-electrode active material contains a lithium-containing oxide represented by $Li_{x2}Na_{y2}Co_\alpha Mn_\beta Ti_{(1-\alpha-\beta)}O_\gamma$ (where $0<x2<1.1$, $0.005 \leq y2 \leq 0.06$, $0.70 \leq \alpha < 1.0$, $0 \leq \beta < 0.3$, $0.85 \leq \alpha+\beta < 1.0$, and $1.9 \leq \gamma \leq 2.1$),
wherein the lithium-containing oxide is obtained by ion-exchanging, with lithium, part of sodium in a cobalt-containing oxide containing sodium and titanium, and
wherein the cobalt-containing oxide is represented by $Li_{x1}Na_{y1}Co_\alpha Mn_\beta Ti_{(1-\alpha-\beta)}O_\gamma$ (where $0 \leq x1 \leq 0.1$, $0.7 \leq y1 < 1.0$, $0.70 \leq \alpha < 1.0$, $0 \leq \beta < 0.3$, $0.85 \leq \alpha+\beta < 1.0$, and $1.9 \leq \gamma \leq 2.1$), and, wherein the lithium-containing oxide contains crystallites having a crystallite size of 250 to 450 Angstrom, both inclusive, the crystallite size being determined by calculating a full width at half maximum of the 002 diffraction peak observed near $2\theta=18.5°$ in an XRD profile and substituting the calculated value into the Scherrer equation.

* * * * *